Feb. 28, 1933.                  A. L. KNAPP                   1,899,443
                               MOTOR VEHICLE
                             Filed Oct. 16, 1930
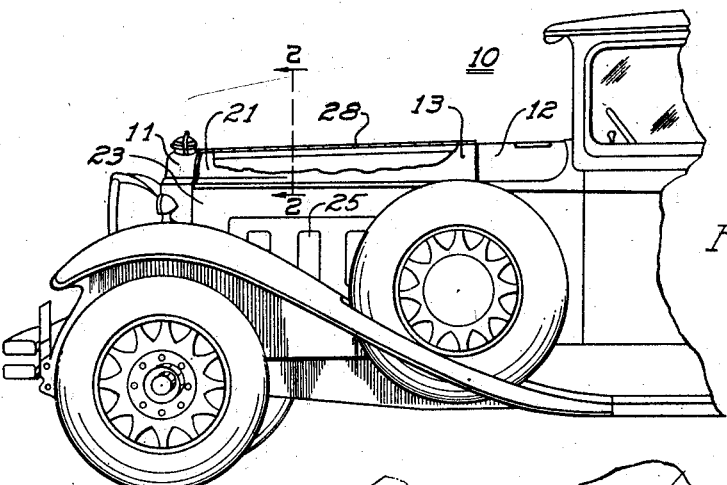
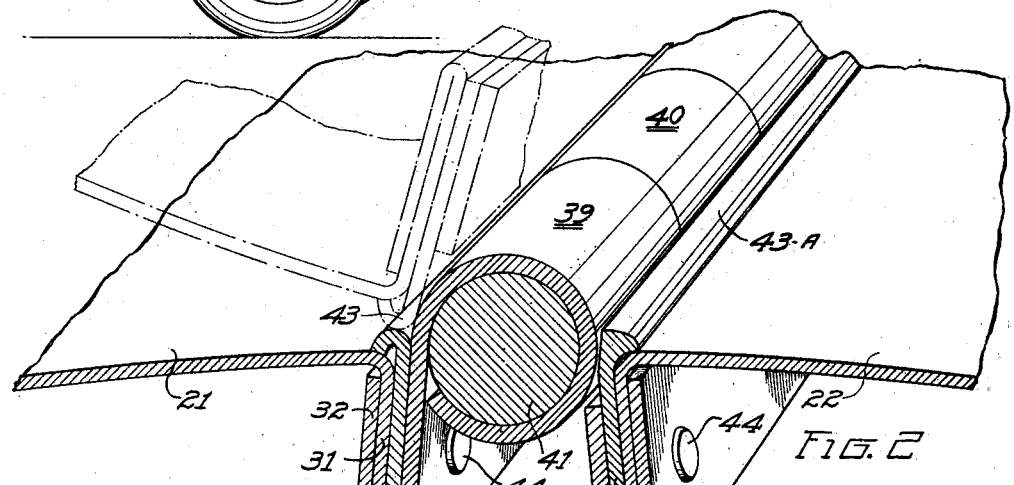
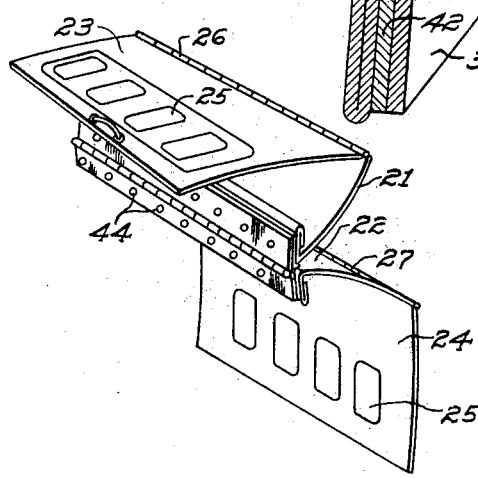
Inventor
ARCHER L. KNAPP
By
       Attorney Patented Feb. 28, 1933

1,899,443

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 16, 1930. Serial No. 489,094.

My invention relates to motor vehicles and has particular relation to the bonnet structure of such vehicles.

Hitherto in the construction of bonnets for motor vehicles, it has been the practice to utilize lugs or tongues of the bonnet panels as hinge parts, the usual practice being to provide a rod, and wrap alternate lugs from one and the other of two adjacent panels loosely about the rod to constitute a hinge. This construction, and other constructions in which the bonnet panels are utilized as hinge parts, have the disadvantage that when the bonnet is open the top panel of the open section rests directly on the top panel of the closed section, and the weight of the open section is transferred directly to the closed top panel, often resulting in injury to the finished surfaces of the panels and distortion and injury of the panels themselves.

My invention is intended to over-come these difficulties and an object of the invention is to provide a bonnet in which injury of the parts thereof is prevented.

Another object of my invention is to provide one section of a bonnet with a rest for supporting the other bonnet section in an opened position.

Another object of my invention is to provide a bonnet hinge in which the hinge leaves and the panels are individual parts.

Another object of my invention is to provide a bonnet in which the edges of the bonnet panels are reinforced.

Further features and objects of the invention will be apparent from the following description taken in connection with the accompanying drawing, in which Fig. 1 is a view in perspective of a motor vehicle utilizing a bonnet constructed according to my invention;

Fig. 2 is an enlarged view in perspective of a portion of the bonnet of the motor vehicle shown in Fig. 1 taken in section along the line 2—2, and Fig. 3 is a view in perspective of the bonnet only, showing my improved hinge structure, the hinge structure being enlarged with respect to the remainder of the bonnet in order to show its construction.

Referring to the drawing, the motor vehicle to which my invention is applied is indicated generally by the numeral 10 and includes a radiator 11 and a cowl 12 upon which the bonnet or hood 13 rests. The bonnet is secured in place on the radiator and cowl by means of clips (not shown) which engage the lower portions of the bonnet and hold them with respect to the frame and dust shield mouldings of the vehicle.

A bonnet, such as used for enclosing the space between the radiator and cowl of a motor vehicle, is usually comprised of four sections or panels, two of the curved panels 21 and 22, which may be termed the top panels, being located above the engine compartment space, while the other two panels 23 and 24 are located at the sides of the engine space. The side panels 23 and 24 may be provided with doors or openings 25 arranged, when open, to permit the passage of air therethrough. The panels are usually highly finished as by painting.

If four panels are used it is necessary to provide three hinges for the bonnet, and this is usually done by providing a rod or tube about which alternate projections or lugs from adjacent panels are wrapped to constitute the hinges. This hinge construction is usually suitable for the two side hinges 26 and 27, but is not suitable for the center hinge 28, for the reason, as hereinbefore explained, that with such a construction when the panels of the bonnet are in the opened position, the open top panel rests directly upon the closed top panel.

My invention is intended to obviate the difficulties of the devices of the prior art. To this end I provide downwardly turned flanges 31 on the inner edges of the top panels. These flanges preferably comprise a downwardly turned edge of the panel and an upwardly turned or return-bent portion 32 bent back against the downwardly projecting part. The hinge itself comprises a pair of oppositely disposed hinge plates 37 and 38 having lugs or ears 39 and 40 extending alternately from one and then the other to encircle the pivot rod or pin 41.

Buffer strips 42 comprised of strips of moulding having beaded or turned upper edges 43, which project above the surfaces of the panels, are disposed between the hinge plates and the downwardly turned flanges of the top panels. The hinge plates, buffer strips and panel flanges are secured together in any desirable manner as by rivets 44.

The buffer strip may be a flat strip turned at its edges, as indicated at 43 or may be provided with a molded bead 43a. The buffer strip and hinge plates may be of any desired material, finished in any desirable manner, but are preferably of a non-corroding material, or plated with a non-corroding material, to give the strip a decorative finish.

On reference to Fig. 2 it is apparent that when the bonnet is open, as indicated by the dotted lines, the weight of the open panels is transferred through the beads 43 of the buffer strip to the plates 37 and pivot rod 41, thus preventing injury of the finished surfaces of the panels or the panels themselves.

The hinge plate, buffer strip, and the downwardly turned flange of each panel extend in parallel planes and afford an excellent reinforcing and stiffening device for the panel. The buffer strip is preferably disposed intermediate the hinge plate and the flange of the panel, but may be located at any other position as desired.

The buffer strip projects above the surface of the panels and is curved to afford support for the bend in the panels. The upwardly extending portion acts as a bumper or buffer so that when the bonnet is open the two buffer strips come together to support the open portion of the bonnet at a spaced distance from the closed portion, so that the top panels themselves do not come into contact with each other. The weight of the open portion of the bonnet is transferred through the buffer strips directly to the hinge plates. The panels are of the same cross sectional area at the bent portions as they are at other sections and are not weakened at the edge by cutting lugs or projections for hinge leaves. The entire strength of the panels is utilized at the edge portion where the bend occurs. The bend of the panels is reinforced by means of curved beaded portions of the buffer strip and consequently a strong structure results.

Although I have described a specific embodiment of my invention, it is apparent that modifications may be made by those skilled in the art. Such modification may be made without departing from the spirit and scope of the invention as set forth in the appended claims.

Having described the various features of my invention, what I claim as new and desire to secure by Letters Patent is:

1. In a motor vehicle engine bonnet, a pair of hinged panel sections, and buffer means reinforcing the panel sections adjacent their hinged portion, said buffer means of one panel section engaging the buffer means of the other panel section to space the panel sections when opened and released.

2. In a motor vehicle bonnet structure including a pair of panels having hinged engagement with each other, a means for preventing bending and injury of the bonnet panels comprising buffer strips disposed between the hinge and the panels to support the panels when the bonnet is open, said buffer strips extending above the panels in a relation to engage and space the panels when one is swung over the other.

3. In a motor vehicle bonnet structure including a plurality of panels having hinged engagement with each other, a means for preventing bending and injury of the bonnet panels comprising buffer strips disposed between the hinge and the panels, having portions thereof projecting above the panels, adapted to come together when the bonnet is open, to transfer the weight of the open bonnet panels to the hinge.

4. In a motor vehicle bonnet structure, a pair of hinge plates, a buffer strip engaged to the outer face of each hinge plate and a bonnet panel fastened to each buffer strip, said strips engaging to space the panels when one panel is opened.

5. In a motor vehicle bonnet structure, a pair of hinge plates, panels secured to the hinge plates and buffer strips disposed between the panels and hinge plates, said strips engaging to space the panels when one panel is opened.

6. In a motor vehicle bonnet structure, a pair of hinge plates, panels secured to the hinge plates, buffer strips between the panels and hinge plates, said strips having bead portions projecting beyond the outer surface of the panels and means for securing the plates, panels and buffer strips together.

7. In a motor vehicle bonnet structure, a pair of panels having flanged edges, a pair of hinge plates secured to the flanged edges of the panels and buffer strips disposed between the hinge plates and the flanged edges of the panels, said buffer strips engaging to space the panels when one of them is opened.

8. In a motor vehicle bonnet structure including a plurality of panels, means for reinforcing the edges of the panels at the hinges comprising flanges on the panels, a pivot rod, a pair of oppositely disposed hinge plates on the rod, a strip disposed between the hinge plates and the flanges on the panels and means for securing adjacent flanges, strips and hinge plates together, said strips being arranged to engage and space the panels when one is swung over the other.

9. In a motor vehicle bonnet structure, hinge plates, panels bent to provide flanges, secured to the hinge plates, and strips intermediate the plates and the panels, said strips having bead portions adapted to bear against the outer surface of the bend of the panels to reinforce the same.

10. In a motor vehicle bonnet structure, hinge plates, and panels bent to provide flanges, secured to the hinge plates, means for reinforcing the flanges comprising strips having bead portions, projecting above the panels, bearing against the bend in the panels and disposed between the flanges and the hinge plates.

11. In a motor vehicle bonnet, a panel and hinge structure comprising a hinge having an inwardly extending plate, a panel having an inwardly bent flanged portion and a buffer strip disposed between the hinge plate and the panel flange, the hinge plate, buffer strip and panel flange all extending in parallel planes, said buffer strips being assembled to engage and space the panels when one panel is swung over the other.

12. In a motor vehicle bonnet, comprising a hinge and a panel secured thereto, a hinge plate, a flange on the edge of the panel extending in a plane parallel to the hinge plate, a buffer strip disposed between the hinge plate and panel flange and extending in a plane parallel to them and means for securing the hinge plate, buffer strip and panel flange together, said buffer strips engaging to space the panels when one is swung over the other.

In testimony whereof I affix my signature.

ARCHER L. KNAPP.